Patented Jan. 21, 1930

1,744,633

UNITED STATES PATENT OFFICE

ERICH HARTMANN AND MAX HARDTMANN, OF WIESDORF-ON-THE-RHINE, AND PAUL KÜMMEL, OF LEVERKUSEN-ON-THE-RHINE, GERMANY, ASSIGNORS TO I. G. FARBENINDUSTRIE AKTIENGESELLSCHAFT, OF FRANKFORT-ON-THE-MAIN, GERMANY

PROCESS FOR PROTECTING WOOL, FUR, RUGS, AND THE LIKE AGAINST THE ATTACK OF MOTHS AND PRODUCTS THEREOF

No Drawing. Application filed November 26, 1926, Serial No. 151,007, and in Germany November 27, 1925.

The present invention relates to a process for rendering permanently moth-proof materials liable to attack by moths, and to the resulting moth-proof materials.

According to our invention, materials liable to be attacked by moths are rendered moth-proof by depositing in or on such materials an organic compound of tin in its quadrivalent state, one of the valences of the tin being saturated by a radicle of the group comprising alkyl, aralkyl and aryl, for example, methyl, ethyl, benzyl, phenyl, toluyl, naphthyl, bromo-phenyl, which radicles may be substituted; and the other three valences of the tin being saturated by the same or different substituents of the group comprising alkyl, aralkyl and aryl radicles, which may be substituted, and organic and inorganic acid radicles, for instance:

$$-OOC.CH_3, =SO_4, =CO_3, -Cl,$$

hydroxyl, oxygen and sulfur.

Thus for example the following compounds lend themselves for incorporation within the pores or attachment otherwise to the materials to be rendered immune from attack by moths: tin-tetraphenyl, tin-tetrabenzyl, tin-tetraethyl, tribenzylated phenylated tin, tin triethyl fluoride, tin diphenyloxide, tin dibenzyldichloride, tin-tribenzylchloride, etc.

These compounds containing the tin in its quadrivalent state exert an excellent protective action, and many other analogous compounds will readily suggest themselves for use in our process, which aims at uniformly incorporating the same within the materials to be treated, so that they will be tenaciously and permanently retained therein.

The following examples will serve to further illustrate our invention:—

*Example 1.*—The woolen material which is intended to be protected from attack by moths is immersed in a 3% solution of tin-tetrabenzyl in benzene. After thoroughly soaking, it is withdrawn from the impregnating liquid, centrifuged, and the solvent is then caused to evaporate either at ordinary or elevated temperature. The tin-tetrabenzyl is now incorporated within the fibre in an extremely finely divided condition, thus rendering the latter unsuitable for the growth of moth larvæ.

*Example 2.*—A solution of two per cent of tin triethylfluoride in a mixture of benzene and alcohol is sprayed on a fur and dried.

A mixture of several of the aforementioned substances may be used if desired.

We claim:—

1. Process for protecting wool, furs and other materials against attack by moths which comprises in corporating with the material to be protected a moth-repelling organic compound of tin in its quadrivalent state.

2. Moth-proof material comprising a material or fabric, liable to be attacked by moths, having incorporated therewith a moth repelling substance containing an organic compound of tin in its quadrivalent state.

3. Process for protecting materials liable to be attacked by moths which comprises incorporating with said materials an organic compound of tin in its quadrivalent state in which one of the valences of the tin is saturated by a radicle of the group comprising alkyl, aralkyl and aryl, and the other three valences of the tin are saturated by substituents of the group comprising alkyl, aralykl, aryl, organic and inorganic acid radicles, hydroxyl, oxygen and sulfur.

4. Moth-proof material comprising a material liable to be attacked by moths having incorporated therewith an organic compound of tin in its quadrivalent state in which one of the valences of the tin is saturated by a radicle of the group comprising alkyl, aralykl, and aryl, and the other three valences of the tin are saturated by substituents of the group comprising alkyl, aralkyl, aryl, organic and inorganic acid radicles, hydroxyl, oxygen and sulfur.

In testimony whereof, we affix our signatures.

ERICH HARTMANN.
MAX HARDTMANN.
PAUL KÜMMEL.